United States Patent
Suetsugu

(10) Patent No.: US 11,823,229 B2
(45) Date of Patent: Nov. 21, 2023

(54) PRODUCT/SERVICE PROPOSAL SYSTEM AND COMPUTER PROGRAM PRODUCT

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 0 days.

(21) Appl. No.: 17/813,815

(22) Filed: Jul. 20, 2022

(65) Prior Publication Data
US 2023/0058611 A1   Feb. 23, 2023

(30) Foreign Application Priority Data
Aug. 18, 2021   (JP) ................. 2021-133224

(51) Int. Cl.
*G06Q 30/0251* (2023.01)
(52) U.S. Cl.
CPC .............. *G06Q 30/0255* (2013.01)
(58) Field of Classification Search
CPC .................................................. G06Q 30/0255
USPC ........................................... 705/14.53, 14.51
See application file for complete search history.

(56) References Cited

U.S. PATENT DOCUMENTS

| | | | | |
|---|---|---|---|---|
| 2003/0154125 A1* | 8/2003 | Mittal | ................ | G06Q 30/0222 705/14.23 |
| 2004/0111347 A1* | 6/2004 | Kauffman | .............. | G06Q 40/06 705/14.27 |
| 2005/0010472 A1* | 1/2005 | Quatse | ............... | G06Q 30/0211 705/14.13 |
| 2008/0243531 A1* | 10/2008 | Hyder | .................... | G06Q 30/02 705/1.1 |
| 2011/0288917 A1* | 11/2011 | Wanek | .................... | H04W 4/21 705/14.5 |
| 2012/0246033 A1* | 9/2012 | Keiser | .................... | G06Q 30/06 705/27.1 |

(Continued)

FOREIGN PATENT DOCUMENTS

| | | | |
|---|---|---|---|
| JP | 2000148847 A | 5/2000 | |
| JP | 2008276449 A | 11/2008 | |

(Continued)

OTHER PUBLICATIONS

Mashael Aldayel, Recognition of Consumer Preference by Analysis and Classification EEG Signals, 2020 (Year: 2020).*

(Continued)

*Primary Examiner* — Tarek Elchanti
(74) *Attorney, Agent, or Firm* — Rosenberg, Klein & Lee

(57) ABSTRACT

Provided is a product/service proposal system and computer program product for making, to a user who considers purchase of a product and/or service, a proposal leading the user to purchase a product and/or service using a display serving as communication means between the user and a supplier that supplies a product and/or service. The product/service proposal system includes a user action history acquisition unit configured to acquire a user action history, a parameter setting unit configured to set parameters indicating preferences of at least one of the user and the supplier in a process in which the user considers the purchase of the product and/or service, and a display proposal unit configured to determine a product and/or service to be proposed to the user on the basis of at least one of the user action history and the parameters and to make a proposal leading the user to purchase the determined product and/or service to the user using the display.

10 Claims, 2 Drawing Sheets

(56) References Cited

U.S. PATENT DOCUMENTS

2015/0371260 A1* 12/2015 Chan ................. G06Q 30/0271
                                                  705/14.51
2016/0086250 A1*  3/2016 Gunjan ............. G06Q 30/0631
                                                  705/26.7

FOREIGN PATENT DOCUMENTS

| JP | 2012247926 A | 12/2012 |
| JP | 2016009416 A | 1/2016 |
| JP | 2016146016 A | 8/2016 |

OTHER PUBLICATIONS

Office Action for Japanese counterpart Application No. 2021-133224 dated Feb. 8, 2022 with English Translation.

* cited by examiner

PRODUCT/SERVICE PROPOSAL SYSTEM AND COMPUTER PROGRAM PRODUCT

TECHNICAL FIELD

The present invention relates to a product/service proposal system and computer program product that make a proposal leading a user to purchase a product and/or service.

BACKGROUND ART

Sales promotion has been performed on the basis of the preferences or product purchase history of users (for example, see Japanese Unexamined Patent Application Publication No. 2002-15199). At real stores or EC sites, products are displayed or represented in accordance with the user trends or a prediction of the trends. However, the prediction may be wrong, or the product purchase history of users may not serve as a reference, or a failure to properly support a user may lead to a failure to have the user know or experience the appeal of a product through a proper representation or tryout, resulting in missing of a sales opportunity. In the first place, there are many real stores or EC sites that randomly cope with users without a sales promotion strategy.

Currently, it is difficult for real stores or EC sites to promote the sales of products sought by users using a proper "display" such as a representation, tryout, or experience.

As used herein, the term "display" refers to any medium serving as communication means that smooths the distribution of a product and/or service purchased by a user and supplied by a supplier and binds the user and supplier together. Specific examples of a "display" include the display or representation of a product or service, interior, the representation of a product/service use scene, the tryout of a product and/or service, a comparison between related products and/or services, a presentation of a comparison between various scenes in which a product and/or service is used, and the like. As related art, Japanese Unexamined Patent Application Publication No. 2016-9416 describes a sales promotion system that acquires customer information including "preferences," "purchase history," "customer reaction," and the like from a customer database, selects a product to be proposed to a customer from a product database on the basis of the customer information, and outputs an image of the product to a display device. As used herein, the term "preferences" refers to information indicating the preferences (favorite color, hobby, etc.) of the customer, which is a member. The term "purchase history" refers to information indicating the past product purchase history (product IDs, purchase dates, prices, etc.) of this member. The term "customer reaction" refers to information indicating the state of interest in a product (product ID) that the customer has yet to purchase, such as the state of a watch on an image of the product displayed in a store (how long the customer has watched the product, etc.), details of a question asked of a shop clerk, and the presence or absence of try-on. Japanese Unexamined Patent Application Publication No. 2000-148847 describes a product information providing system that when selecting a product to be proposed to a customer, considers the history of products that have been proposed to the customer in the past. Japanese Unexamined Patent Application Publication No. 2016-146016 describes a WEB page providing system that proposes a product and/or service in consideration of the relation with the past purchase history. Japanese Unexamined Patent Application Publication No. 2008-276449 describes a product recommendation system that recommends not only a product matching the search conditions but also a similar product as an alternative. Japanese Unexamined Patent Application Publication No. 2012-247926 describes a recommender system that reflects the intent of a product provider as a proposal product.

See Japanese Unexamined Patent Application Publication Nos. 2002-15199, 2016-9416, 2000-148847, 2016-146016, 2008-276449, and 2012-247926.

SUMMARY OF INVENTION

The present invention has been made in view of the above problems, and an object thereof is to provide a product/service proposal system and computer program product that make, to a user who considers purchase of a product and/or service, a proposal leading the user to purchase a product and/or service using a "display" serving as communication means between the user and a supplier that supplies a product and/or service.

To accomplish the above object, a product/service proposal system according to the present invention is a product/service proposal system for making, to a user who considers purchase of a product and/or service, a proposal leading the user to purchase a product and/or service using a display serving as communication means between the user and a supplier that supplies a product and/or service. The product/service proposal system includes a user action history acquisition unit configured to acquire a user action history including a history of actions taken by the user and a history of actions received by the user in a process in which the user considers the purchase of the product and/or service, a parameter setting unit configured to set parameters indicating preferences of at least one of the user and the supplier in the process in which the user considers the purchase of the product and/or service, and a display proposal unit configured to determine a product and/or service to be proposed to the user on the basis of at least one of the user action history and the parameters and to make a proposal leading the user to purchase the determined product and/or service to the user using the display.

The product/service proposal system according to the present invention determines a product and/or service to be proposed to the user on the basis of at least one of the user action history and the set parameters and makes a proposal leading the user to purchase the determined product and/or service to the user using a display. Thus, the product/service proposal system is able to make a proper proposal leading the user to purchase the product and/or service to the user and to promote the sales of the product and/or service.

In the product/service proposal system according to the present invention, the display proposal unit analyzes a correlation between past and current of the user action history acquired by the user action history acquisition unit and then makes the proposal leading the user to purchase the product and/or service to the user using the display.

The product/service proposal system according to the present invention is able to make a proposal leading the user to purchase the product and/or service to the user.

In the product/service proposal system according to the present invention, in case the past of the user action history is the history when the user viewed a product and/or service on an EC site and the current of the user action history is the history when the user visits a real store, the display proposal unit makes the proposal leading the user to purchase the product and/or service to the user according to the viewing time of the product and/or service on the EC site.

The product/service proposal system according to the present invention is able to make a proposal leading the user to purchase the product and/or service to the user.

In the product/service proposal system according to the present invention, the parameters set by the parameter setting unit include a parameter indicating the degree to which the user is goal pursuing-type or purchase process enjoying-type in a process until the user selects a product and/or service to be purchased.

The product/service proposal system according to the present invention allows the user to slowly enjoy or efficiently shortly complete the process until the user selects a product and/or service to be purchased, in accordance with a purpose for which the user purchases a product and/or service.

In the product/service proposal system according to the present invention, the product/service proposal system further includes a proposal rule storage unit configured to store proposal rules according to the parameters set by the parameter setting unit. The parameters set by the parameter setting unit include a goal pursuing level indicating the extent to which the user prefers to purchase a product and/or service in a short time. The proposal rule storage unit stores the proposal rule of proposing to the user a product and/or service with higher similarity to the product and/or service that the user intends to purchase as the goal pursuing level is higher. When the product and/or service that the user intends to purchase and the goal pursuing level are set by an input operation or AI, the display proposal unit determines a product and/or service to be proposed to the user according to the goal pursuing level and the proposal rule to make a proposal leading the user to purchase the determined product and/or service to the user using the display.

The product/service proposal system according to the present invention is able to make a proposal leading the user to purchase the product and/or service to the user.

In the product/service proposal system according to the present invention, the product/service proposal system further includes a proposal rule storage unit configured to store proposal rules according to the parameters set by the parameter setting unit. The parameters set by the parameter setting unit include a process enjoying degree indicating the extent to which the user prefers to take time to purchase a product and/or service. The proposal rule storage unit stores the proposal rule of proposing to the user a product and/or service with lower similarity to the product and/or service that the user intends to purchase as the process enjoying degree is higher. When the product and/or service that the user intends to purchase and the process enjoying degree are set by an input operation or AI, the display proposal unit determines a product and/or service to be proposed to the user according to the process enjoying degree and the proposal rule to make a proposal leading the user to purchase the determined product and/or service to the user using the display.

The product/service proposal system according to the present invention is able to make a proposal leading the user to purchase the product and/or service to the user.

In the product/service proposal system according to the present invention, the parameters set by the parameter setting unit include a parameter indicating the extent to which proposals leading the user to purchase products and/or services related to the product and/or service that the user intends to purchase are made in addition to the proposal leading the user to purchase the intended product and/or service.

According to the present invention, proposals leading the user to purchase products and/or services related to the product and/or service that the user intends to purchase are also made. This allows the user to select a desired product and/or service from a wide variety of related options.

In the product/service proposal system according to the present invention, the parameters set by the parameter setting unit include a parameter indicating at least one of an expansion level from a product and/or service that the user intends to purchase to an alternative product and/or service to be proposed in place of the product or service that the user intends to purchase and a leap level from the product and/or service that the user intends to purchase to the alternative product and/or service.

According to the present invention, the user is also able to receive a proposal of a product and/or service alternative to the product and/or service that the user intends to purchase and to select the alternative product and/or service.

In the product/service proposal system according to the present invention, the parameters set by the parameter setting unit include at least one of a sales importance level indicating what degree of importance the supplier places on sales of the product and/or service, an image improvement level indicating what degree of importance the supplier places on an improvement in an image of the supplier, a repeater acquisition level indicating what degree of importance the supplier places on acquisition of a repeater of the product and/or service, and a marketing information acquisition level indicating what degree of importance the supplier places on acquisition of marketing information based on the user action history.

According to the present invention, the proposal leading the user to purchase the product and/or service can be made to the user taking into account the viewpoint of the supplier that supplies the product and/or service.

A computer program product according to the present invention is a computer program product for making, to a user who considers purchase of a product and/or service, a proposal leading the user to purchase a product and/or service using a display serving as communication means between the user and a supplier that supplies a product and/or service. The computer program product causes a computer to function as user action history acquisition means configured to acquire a user action history including a history of actions taken by the user and a history of actions received by the user in a process in which the user considers the purchase of the product and/or service, parameter setting means configured to set parameters indicating preferences of at least one of the user and the supplier in the process in which the user considers the purchase of the product and/or service, and display proposal means configured to determine a product and/or service to be proposed to the user on the basis of at least one of the user action history and the parameters and to make a proposal leading the user to purchase the determined product and/or service to the user using the display.

The computer program product according to the present invention is able to make a proposal leading the user to purchase the product and/or service to the user.

DESCRIPTION OF EMBODIMENTS

Figure 1:
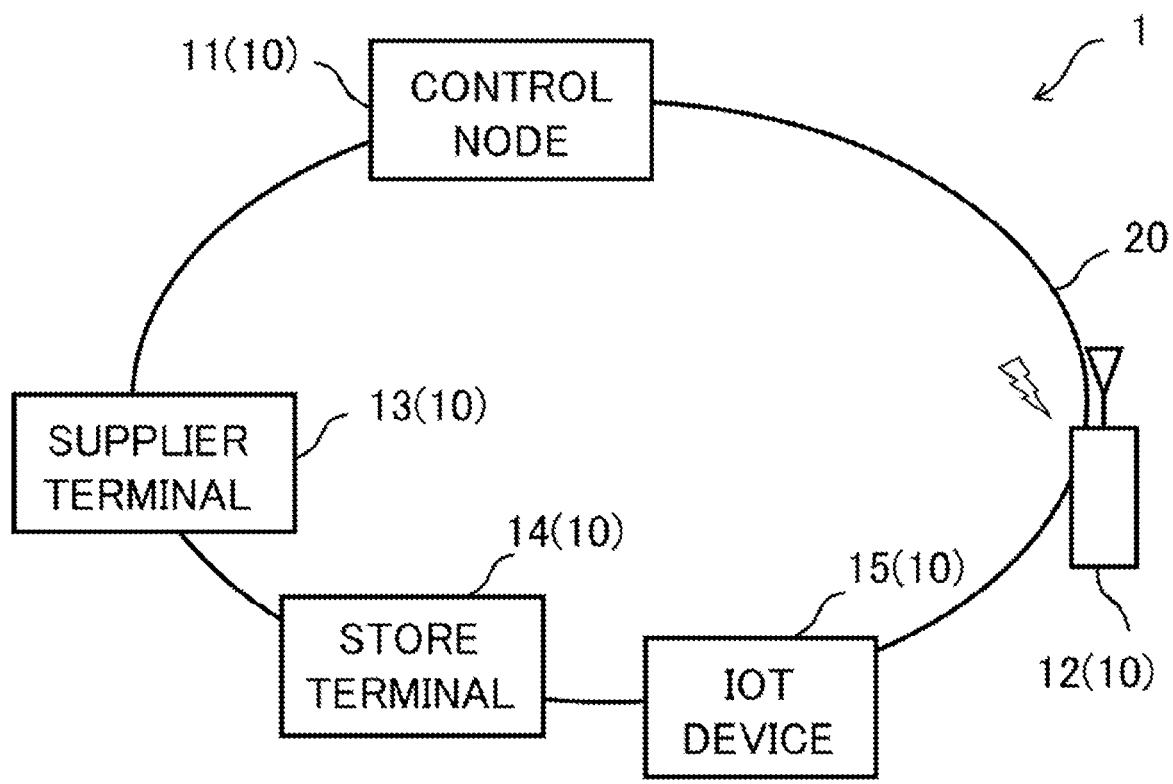
FIG. 1 is a diagram showing the overall configuration of a product/service proposal system according to an embodiment of the present invention.

Now, an embodiment of the present invention will be described in detail with reference to the drawings. FIG. 1 is a diagram showing the overall configuration of a product/service proposal system 1 according to the embodiment of the present invention. As shown in FIG. 1, the product/service proposal system 1 includes multiple nodes 10 forming a blockchain network 20. The nodes 10 include a control node 11 that controls the entire product/service proposal system 1, a user terminal 12 owned by a user, a supplier terminal 13 owned by a supplier that supplies a product and/or service to the user, a store terminal 14, such as a personal computer or accounting register, installed in a real store that sells the product and/or service or owned by a vendor that operates an EC site, and an IOT device 15, such as a sensor or camera, included in IOT. The nodes 10 are communicatively connected to each other through the blockchain network 20. The user terminal 12 and supplier terminal 13 are, for example, communication terminals such as personal computers or portable information terminals.

The term "display" in the present embodiment refers to any type of medium serving as communication means that binds together a user who considers the purchase of a product and/or service and a supplier that supplies a product and/or service. Specific examples of a "display" include the display or representation of a product and/or service, interior, the representation of a product/service use scene, a tryout of a product and/or service, a comparison between related products and/or services, a presentation of a comparison between various scenes in which a product and/or service is used, and the like.

Next, the configuration of the control node 11 will be described. The control node 11 is a computer having a communication function and includes, as hardware, a CPU, a storage device including RAM, ROM, and hard disk, a communication interface that controls communication through the blockchain network 20, and input/output interfaces such as a keyboard and a speaker. Software such as various types of data, databases and programs are stored in the storage device of the control node 11. Examples of the data stored in the storage device of the control node 11 include the history of actions taken by the user and the history of actions received by the user collected from the user terminal 12, IOT device 15, and the like (hereafter referred to as the "user action history"), parameters previously inputted by the user and supplier through the input interface, proposal rules according to the parameters, various types of learning data used to make a determination by AI, image data or voice data used to present various proposals to the user, and the like.

Figure 2:
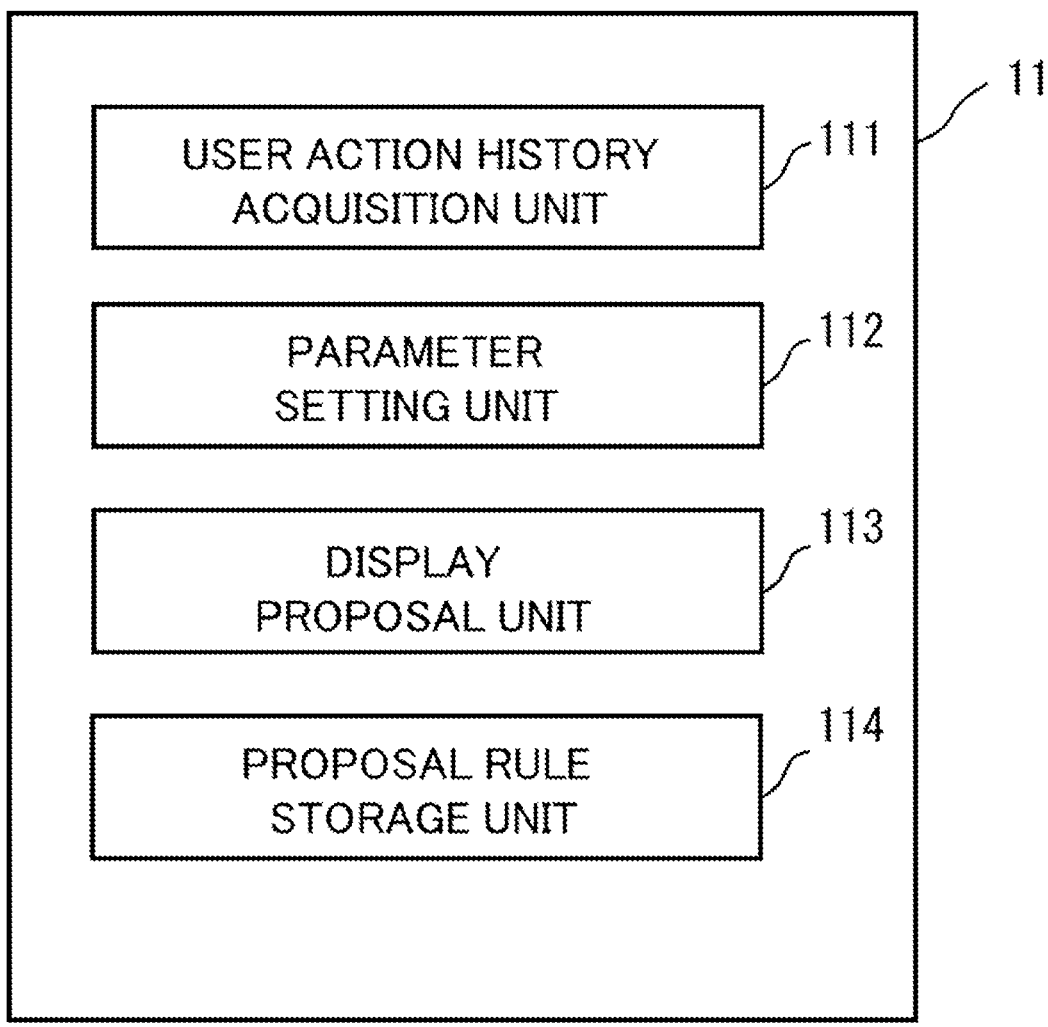
FIG. 2 is a diagram showing the functional elements of the control node of the product/service proposal system according to the embodiment.

Examples of the programs stored in the storage device of the control node 11 include a program for acquiring the user action history, a program for setting parameters when making a proposal to the user, a program for determining a product and/or service to be proposed to the user on the basis of at least one of the user action history and the parameters and making a proposal leading the user to purchase the determined product and/or service using various "displays," a program for presenting a product image, an user image in which the user is trying on a product, or an image in which a background scene is combined with the user image, and the like. When the CPU of the control node 11 performs processing in accordance with the software stored in the storage device, functional elements shown in FIG. 2 are implemented in the control node 11.

A user action history acquisition unit 111 acquires the user action history including the history of actions taken by the user and the history of actions received by the user from a real store or EC site in the process in which the user considers the purchase of a product and/or service.

Specifically, the user action history acquisition unit 111 acquires the personal information of the user, various types of information on products and/or services displayed on the screen, the staying place and staying date/time of the user, actions such as touches or try-on on products by the user in a real store, details of a proposal using "displays" received by the user, action information received from the store terminal 14 and the like, and others from the user terminal 12, store terminal 14, the IOT device 15 such as a sensor or camera, and the like through the blockchain network 20. Examples of the "various types of information on the products and/or services displayed on the screen" include information indicating that the user has taken actions such as displaying of a try-on image, an image in which a clothes use scene is combined with the try-on image as the background, or the like on the screen of the user terminal 12 and simulating of clothes that match the user or use scene in order to weigh against each other clothes that may be purchased by the user. The user action history acquisition unit 111 sequentially stores the acquired pieces of information in a database provided in the storage device as the user action history.

A parameter setting unit 112 sets parameters indicating the preferences of the user and/or supplier in the process in which the user considers the purchase of the product and/or service. The setting of the parameters may be performed by input to the user terminal 12 by the user or input to the supplier terminal 13 by the supplier, or may be performed automatically by AI. The specific types of parameters will be described later.

A display proposal unit 113 determines a product and/or service to be proposed to the user on the basis of at least one of the user action history and the parameters and makes a proposal leading the user to purchase the product and/or service to the user using "displays."

A proposal rule storage unit 114 stores proposal rules according to the parameters set by the parameter setting unit 112.

For example, the proposal rule storage unit 114 stores the proposal rule of proposing to the user a product and/or service with higher similarity to the product and/or service that the user intends to purchase as "a goal pursuing level" is higher. Here, "a goal pursuing level" indicates the extent to which the user prefers to purchase a product and/or service in a short time and/or through a short route in a process until the user selects the product and/or service to be purchased.

For another example, the proposal rule storage unit 114 stores the proposal rule of proposing to the user a product and/or service with lower similarity to the product and/or service that the user intends to purchase as "a process enjoying degree" is higher. Here, "a process enjoying degree" indicates the extent to which the user prefers to take time to purchase a product and/or service in a process until the user selects the product and/or service to be purchased.

Specific examples of the parameters set by the parameter setting unit 112 and the proposal made by the display proposal unit 113 will be described below.

For example, it is assumed that a user purchases a product and/or service in the course of "A (advertising medium)→B (view at EC store)→C (try out at real store)→purchase" as the user action history. In this case, the display proposal unit 113 makes the most suitable "displays" at the scenes A, B, and C.

To have the user become a product purchase repeater, the display proposal unit 113 may prepare "displays" that notify of next product sale or can lead to next product purchase. Specifically, the display proposal unit 113 prepares "displays" as described below that specialize in making the user a repeater, that is, leading the user from the goal to next start.
(1) A "Display" Most Suitable to have the User Reach the Product Selection Start Point so that the User Purchases a Product
"(advertisement)→start (consider viewing of product)→ . . . "

One specific example: it is becoming cold; and the display proposal unit 113 places a motivation advertisement urging the user to purchase cold weather clothing and thus guides the user to a place where the user can purchase cold weather clothing.
(2) A "Display" Most Suitable to have the User Considering Viewing of Products Try them Out
"(consider viewing of product)→(tryout)→ . . . "

One specific example: while the user views multiple pieces of cold weather clothing, the display proposal unit 113 makes "displays" urging the user to try on the pieces of cold weather clothing so that the user tries them on and thus creates a new possibility. More specifically, the display proposal unit 113 makes a proposal indicating that "these gloves will give you a high wearing comfort" and "the design of this muffler will become you" using "displays." By having the user try on or out the pieces of cold weather clothing, that is, having the user experience them, the display proposal unit 113 promotes purchase.
(3) A "Display" Most Suitable to have the User Who has Tried Out the Products Reach Purchase
"(tryout)→(purchase)"

One specific example: the user tries on the pieces of cold weather clothing; and the display proposal unit 113 makes, to the user, a proposal that this product is a good buy now, or this product will fit the body shape of the user, environment, or purpose and therefore it is a good deal to purchase it at this timing, or the like using "displays."
(4) A "Display" Most Suitable to have the User Who has Purchased a Product Make Next Purchase (Become a Repeater)
"(current purchase)→(next purchase)"

One specific example: the display proposal unit 113 makes a proposal that "a new model of the cold weather clothing that you have purchased this time will appear on the market next year. Please come to see it again" using "displays," or predicts the next year's weather, the user's action schedule, the trend, or the like and motivates the user to come to the store next time.

Conceivable methods for making a proposal to the user include displaying simulation results on the screen of the user terminal 12 as a three-dimensional image, displaying a proposal on a large display installed in a real store, presenting a proposal using a technology such as VR, AR, or hologram, and others.

The display proposal unit 113 analyzes the correlation between the past and current of the user action history acquired by the user action history acquisition unit 111 and then makes a proposal leading the user to purchase the most suitable product and/or service to the user using "displays."

For example, the display proposal unit 113 analyzes the correlation between the past and current of products and/or services purchased by the user on the basis of the user action history acquired by the user action history acquisition unit 111 and then makes a proposal leading the user to purchase the most suitable product and/or service to the user using "displays."

For another example, the display proposal unit 113 analyzes the correlation between the past purchase experience and the current purchase experience of the user and promotes the purchase of the most suitable product and/or service using the most suitable "display."

Specifically, the display proposal unit 113 makes a "display" most suitable at the current point with reference to information at the previous point of the user action history taken over by the current point. Information at the previous point is taken over by the current point, for example, in the following patterns:

Advertising medium (previous point)→real store (current point);
Advertising medium (previous point)→EC (current point);
Real store (previous point)→EC (current point);
Real store (previous point)→real store (current point);
EC site (previous point)→EC site (current point); and
EC site (previous point)→real store (current point).

The types of information at each point referred to by the user action history acquisition unit 111 include the date and time, the time spent on purchase by the user, the area in which the user has made purchase, the specific products and/or services that the user has viewed, details, types, or categories of the "displays" used, actions taken by the user, actions taken on the user by a real store, an EC site, and a related service, and others.

One specific example: a user refers to an advertising medium A and then visits a real store B; and to propose the most suitable product and/or service to the user using "displays," the display proposal unit 113 refers to the date and time when the user has viewed the advertisement last time, the area in which the user has viewed the advertisement, details, type, and category of the advertisement viewed, actions taken by the user, actions on the user taken by a real store or an EC site, and others acquired by the user action history acquisition unit 111 and proposes Sanuki udon (udon noodles from Kagawa Prefecture) and fashionable clothing suitable for Sanuki udon using "displays" suggesting a spa in Kyushu.

Another specific example: in case the past of the user action history is the history when the user viewed a product and/or service on an EC site and the current of the user action history is the history when the user visits a real store, the display proposal unit 113 makes a proposal leading the user to purchase the product and/or service to the user according to the viewing time of the product and/or service on the EC site.

For example, a user refers to an EC site A and then visits a real store B; and the display proposal unit 113 refers to information indicating that the user has referred to a keyholder at the EC site for 30 minutes but has not purchased it acquired by the user action history acquisition unit 111 and makes a proposal emphasizing tryout of the keyholder at the real store B using "displays."

Yet another example: a user performs purchase, tryout, or the like at a real store A and then visits an EC site B; since information at the previous point acquired by the user action history acquisition unit 111 indicates that the user has stayed at the real store in the Nagano Prefecture for as short as 20 minutes and has not viewed or try out many products, the display proposal unit 113 decides to recommend products having a small amount of Nagano taste and an increased amount of other tastes and makes a proposal for having the user obtain wider information and try out more products using "displays."

The parameters set by the parameter setting unit 112 include a parameter indicating the degree to which the user is goal pursuing-type or purchase process enjoying-type in a process until the user selects a product and/or service to be purchased.

When setting this parameter, first, "goal pursuing-type" or "purchase process enjoying-type" is selected by the user themself through input or automatically by AI. If the user or AI cannot decide which type should be selected, the display proposal unit 113 refers to the past data or similar user data acquired by the user action history acquisition unit 111 and makes a proposal to the user using "displays." The set "goal pursuing-type" or "purchase process enjoying-type" may be changed to the other halfway.

When "goal pursuing-type" is selected, setting of the goal pursuing level is performed next. This is because there are users who think that it is not fun to purchase a necessary product through an excessively short route and users who want to purchase a necessary product through the shortest route due to a lack of time. The "goal pursuing level" can be set to, for example, "high," "medium," or "low", or level "0," "1," "2," "3," . . . , or "N" (N is an integer), or the like.

One specific example: a user wants to purchase a cleaner as soon as possible and therefore selects "goal pursuing-type" and sets the "goal pursuing level" to "high"; and thus, the display proposal unit 113 provides, to the user, information such as the detailed specification, design, feel of using, price, after-sale service, credibility, and use scene of a product sought by the user as "displays" assisting the user in purchasing a product best for the user quickly in comparison with other products.

Another specific example: to purchase the same model number of underwear as that regularly purchased by a user, the user selects "goal pursuing-type" and sets the "goal pursuing level" to "highest"; and the display proposal unit 113 makes "displays" emphasizing tryout of underwear in consideration of a case in which the body shape of the user changes.

Even if "purchase process enjoying-type" is selected, it is necessary to adjust the level at which the user enjoys the purchase process. The reason is that the level greatly varies among persons such as a person who wants to enjoy the purchase process moderately and a person who wants to enjoy the process very much, depending on the spare time, hobbies and preferences, personality, or the like of the user. The "level at which the user enjoys the purchase process" include the "expansion level" of information, the "leap level" of information category or the like, the "purchase time level," which is the length of time that the user spends in the purchase process, and others. The "expansion level" is the magnitude with which information expands, and the "leap level" is the extent of leap from the same category to a different category. For example, boots, sandals, or socks are proposed to a user who wants to buy shoes. In this case, the boots or the like can be suggested in relation to the same category of legs. On the other hand, proposing foot massage equipment is a leap. This is because while the foot massage equipment is related to legs as with shoes, it comes under a different category. Similarly, proposing a nail clipper is a leap although it is also related to legs.

One specific example of adjustment of the "purchase time level": a user wants to enjoy the purchase process, therefore sets, with respect to the level at which the user enjoys the purchase process, the "expansion level" to a medium level, the "leap level" to a medium level, and the "purchase time level" to a high level, decides to enjoy purchase itself for a change of pace although they actually intends to buy a frying pan, views or tries out goods related to a wide variety of food while viewing a scene in which they may be able to make healthy food on their own, or trying out an apron or cookware suitable for themself, or checking whether the design is suitable for themself or their room, enjoys the purchase process while viewing or trying out a related scene in which when they get tired of making food, the fatigued muscle is massaged using a massage tool and thus blood flow is improved or related "displays," further enjoys the purchase process while viewing or experiencing a scene in which they travels to a region in which spice necessary for food is available or a "display," and then decides to buy one frying pan.

The parameters set by the parameter setting unit 112 also include a parameter indicating which of first half, middle, and second half the "purchase decision climax," at which the user decides to purchase a product and/or service, is. One specific example: a user aims to buy a T-shirt for hot summer; the display proposal unit 113 has the user view or experience an advance hint-like scene proposal that proposes goods used in the same scene, for example, by proposing a total coordination of short pants, sandals, and the like with a T-shirt or proposing an insect bite prevention chemical in summer; and in this case, the parameter setting unit 112 may set the purchase decision climax, in which information for deciding purchase of the originally intended T-shirt is provided to the user and thus the user purchases the T-shirt, to one of first half, medium, and second half on the basis of user input or automatically by AI or the like, or proposals may be made automatically by AI or the like. For example, when the user sets the "purchase decision climax" to middle, they is able to decide the purchase of the T-shirt in the middle of the purchase process and then to enjoy shopping of other related products or alternative products together with the "display" proposal.

In any of "goal pursuing-type" and "purchase process enjoying-type," the "display" proposal start point varies depending on the extent to which the user themself is grasping what kind of product and/or service the user is seeking. In the present embodiment, there are three extents (A), (B), and (C).

Extent (A): the user has already decided the name, size, color, model number, and the like of a specific product of a supplier or manufacturer.

This is also called "purpose buying." Examples of extent (A) include a case in which a user purchases the same model number of product as that regularly purchased by the user and a case in which even if a user purchases one product for the first time, the user previously grasps detailed information on the product such as the model number and then purchases it. In the latter case, the user tries out the product or compares it with a similar product to make doubly sure so that the user can purchase the product with conviction.

Extent (B): a user is roughly grasping what product the user will buy but has yet to decide which supplier's or manufacturer's product they will buy, and the like.

One example is that a user wants to purchase a personal computer but has yet to decide which manufacturer's personal computer they will buy, and the like.

Extent (C): a user has a goal to achieve but has yet to grasp the category or other details of a product and/or service for achieving the goal.

One example is that a user wants to take earthquake resistance measures on the home or office but has yet to grasp what products are on the market.

Since (A)<(B)<(C), a proposal using a wider variety of "displays" is made in (C). The user themself may set the extent to one of (A), (B), and (C) by operating the user terminal 12, or, the parameter setting unit 112 may ask the user about which of (A), (B), and (C) the extent of the user of "goal pursuing-type" corresponds to, using AI on the basis of exchange of data or information in the past, or the like. When the user remembers the model number or the like halfway, they may reselect the extent by changing or modifying the set extent through input.

The parameters set by the parameter setting unit 112 also include a parameter indicating the extent to which proposals leading the user to purchase product and/or services related to the product and/or service that the user intends to purchase are made in addition to the proposal leading the user to purchase the intended product and/or service (hereafter referred to as the "related product proposal parameter").

For example, if the product is clothing, the most suitable product that the display proposal unit 113 should propose to a user who intends to buy a T-shirt is a T-shirt. On the other hand, "related product proposal" is to propose the total coordination of the clothing of the whole body including the T-shirt. Proposing a set of a T-shirt and a hat is also "related product proposal" although this is not the total coordination of the clothing of the whole body. Since there are users who take time in selecting a product or feel troublesome when related products are excessively proposed using "displays," related product proposals may be arbitrarily set by the user or automatically set. Preferably, the level of the "related product proposal parameter" is represented by a number such as "0," "1," "2," "3," . . . , or "N" (N is an integer). The extent to which related products are proposed is increased as a larger number is set.

For example, if a user intends to purchase an umbrella and is searching for an umbrella matching their preferences and the level of the "related product proposal parameter" is "0," the display proposal unit 113 does not propose rain gear or the like, which is a product related to an umbrella but rather makes a "display" that allows the user to select only an umbrella best for the user most shortly. As the level of "related product proposal parameter" becomes a larger number as seen in "0," "1," "2," and the like, the type or width of related products to be proposed is increased. In the present embodiment, the level of "related product proposal parameter" includes two types: the expansion level of a related product itself and the leap level of a related product. These terms are similar to those described above, that is, the "expansion level of a related product itself refers to the width within which information is suggested, and the "leap level of a related product" refers to the allowance of the leap of a category. The display proposal unit 113 determines a product and/or service to be proposed to the user on the basis of the set "expansion level" and "leap level" and makes a proposal leading the user to purchase the determined product and/or service to the user using "displays."

The parameters set by the parameter setting unit 112 also includes a parameter indicating the level at which there is proposed an alternative product and/or service in place of a product and/or service that a user intends to purchase (hereafter referred to as the "alternative product proposal level"). As used herein, the term "proposing an alternative product" refers to proposing another product that achieves the same goal. Thus, the display proposal unit 113 is able to propose the alternative product in place of to the product and/or service that the user intends to purchase. Also, the "alternative product proposal level," at which the alternative product is proposed to the user, can be adjusted. Since there are users who think that a proposal of an alternative product is helpful or fun and users who conversely do not think so, it is useful to adjust the "alternative product proposal level."

For example, when a user intends to buy a deodorant, the display proposal unit 113 may propose an aromatic, which is a different type of product, as a product alternative to the deodorant so that the user is not bothered by an odor. By further increasing the alternative product proposal level, an electric fan may be proposed as an alternative product in order to blow off an odor.

Also, for example, when a user intends to purchase a thick jacket for cold weather protection, the display proposal unit 113 may propose a "kotatsu" or "air-conditioner," which can achieve the same cold weather protection, using "displays." A "kotatsu" or the like is an alternative product that has the same warming purposes but uses different means. Since an alternative product can also leap to various products, it is necessary to adjust the "alternative product proposal level" in accordance with the purchase efficiency, the preferences of the user, or the like. In the present embodiment, the "alternative product proposal level" includes two types: the expansion level of an alternative product and the leap level of an alternative product. These terms are similar to those described above, that is, the "expansion level of an alternative product" refers to the width within which an alternative product and/or service is suggested from the original product and/or service, and the "leap level of an alternative product" refers to the allowance of leap of the category from the original product and/or service to an alternative product and/or service.

The parameters set by the parameter setting unit 112 also include the "competitive supplier information level" indicating the degree to which information for weighing competitive products and/or services against each other is presented to the user.

When making purchase, users may weigh against each other products of competitive suppliers having the same purpose as products that the users are viewing or trying out as products to be purchased. Many users want to do such behavior to make the best purchase. However, when multiple products of competitive suppliers are presented to users, some users may feel that information is too much. Even if suppliers can be selected from those around the world, some users may feel that information is too much and may not want such too much information. For this reason, depending on the user, it is necessary to adjust the extent to which information on products of competitive suppliers is displayed. In the present embodiment, the parameter setting unit 112 sets the "competitive supplier information level" to a number such as "0," "1," "2," "3," . . . , "N" (N is an integer). A larger amount of competitive supplier information is displayed as a larger number is set.

One specific example: a user decides to buy business shoes, sets the "competitive supplier information level" to "3," and thus is able to make mostly satisfiable purchase without feeling that information is too much. Another specific example: a user decides to buy drink water immediately, sets the "competitive supplier information level" to "2," and thus is able to reduce display of competitive supplier information, to purchase drink water immediately, and to drink water. Yet another specific example: a user who does much deskwork decides to buy a special desk, wants to select among desks from domestic suppliers as well as overseas suppliers, and thus sets the "competitive supplier information level" to "10"; many pieces of competitive supplier information are displayed; and the user is able to thoroughly weigh them against each other and to make purchase that the user considers as the best.

The parameters set by the parameter setting unit 112 also include the "detailed specification/transaction conditions display emphasizing level" indicating the level at which the specification of a product or the conditions of service transactions is displayed. When a user is given too many advertisements when selecting a product, they tends to omit the check of the detailed specification that they needs to do. To prevent this, the user may adjust the level at which the detailed specification is displayed. In the case of a product, the level at which the specification is displayed is adjusted; in the case of a service, the level at which the transaction conditions are displayed is adjusted. In the present embodiment, the parameter setting unit 112 sets the "detailed specification/transaction conditions display emphasizing level" to a number such as "0," "1," "2," "3," . . . , "N" (N is an integer). The specification or transaction conditions is displayed in a more emphasized manner as a larger number is set.

One specific example: a user plans a trip to Kyushu with reference to travel sites; but advertising portions are excessively emphasized in the sites; for this reason, the user decides to select transportation means, meals, a local spa, souvenirs, and the like in the trip while thoroughly weighing displayed detailed transaction conditions or product specifications against each other, sets the "detailed specification/transaction conditions display emphasizing level" to "8," and thus is able to thoroughly weigh against each other displayed information that includes less advertisements and describes the specification of multiple products or the transaction conditions of multiple services in details and to plan and carry out a trip to Kyushu.

Another specific example: a user intends to purchase a smartphone but wants to view almost no advertisements, decides to make purchase while mainly weighing displayed specifications against each other, thus sets the "detailed specification/transaction conditions display emphasizing level" to "10," and is able to thoroughly compare the functions of multiple smartphones with reference to the screen displaying no advertisements and the detailed specifications of the smartphones and to purchase a desired smartphone.

The parameters set by the parameter setting unit 112 also include the "user evaluation display level" for adjusting the degree to which evaluations made by other users, reputations, and the like are referred to. One user who intends to purchase a product and/or service may want to refer to detailed evaluations made by other users on the intended product and/or service, or may only have to refer to a moderate number of evaluations made by other users due to having been given too much information or having no time. For this reason, it is necessary to adjust the "user evaluation display level." In the present embodiment, the parameter setting unit 112 sets the "user evaluation display level" to a number such as "0," "1," "2," "3," . . . , or "N" (N is an integer). User evaluations are displayed in more detail as a larger number is set.

One specific example: one user intends to travel to a spa in Kyushu, wants to enter a local, standard spa, thus sets the "user evaluation display level" to "5," and selects a desired spa with reference to evaluations or opinions of other users.

The parameters set by the parameter setting unit 112 also include the "adviser need check level" for adjusting opportunities in which a user gets an advice when making purchase. For example, the display proposal unit 113 may mechanically ask a user a question such as "do you need to get an advice for this purchase?" using AI to give a user an opportunity in which the user gets a paid or free advice, at the key points of purchase. However, there are users who frequently need an indication such as "do you get an advice?" and users who less frequently need such an indication. That is, users have different preferences. For this reason, it is necessary to adjust the "adviser need check level." An advice may be given by AI or human. In the present embodiment, the parameter setting unit 112 sets the "adviser need check level" to a number such as "0," "1," "2," "3," . . . , or "N" (N is an integer). Opportunities in which a user gets an advice are increased as a larger number is set.

One specific example: a user intends to buy a suit, wants to get an advice due to not knowing how to dress well, and sets the "adviser need check display level" to "5" due to only having to know how to dress well in a standard manner. Another specific example: a user intends to buy sweet half sake, wants to thoroughly listen to opinions of experts in detail, and thus sets the "adviser need check display level" to "10."

Supplier-related parameters set by the parameter setting unit 112 include at least one of the "sales importance level" indicating what degree of importance a supplier places on the sales of a product and/or service, the "image improvement level" indicating what degree of importance a supplier places on an improvement in the image of the supplier, the "repeater acquisition level" indicating what degree of importance a supplier places on the acquisition of a repeater of a product and/or service, and the "marketing information acquisition level" indicating what degree of importance a supplier places on the acquisition of marketing information based on the user action history. The respective levels will be described below.

(1) "Sales Importance Level"

The "sales importance level" is a level specialized in causing a supplier to increase the sales in a sales opportunity and is a level of a sales style in which importance is placed on increasing the average spend per customer at one-time purchase. For example, when users are less likely to make repeated purchase, the supplier takes this strategy on the basis of a management decision. In the present embodiment, the parameter setting unit 112 sets the "sales importance level" to a number such as "0," "1," "2," "3," . . . , or "N" (N is an integer). Greater importance is placed on the sales as a larger number is set. One specific example: a product that a user has judged to be most suitable is a season product; and therefore the display proposal unit 113 proposes the appeal of related products to the user so that those products are sold all at once.

(2) Image Improvement Level

If a supplier is not only increasing sales but also investing in the management of an EC site or real store as promotion, advertisement strategy, brand strategy, or image strategy, it may set the "image improvement level." In the present embodiment, the parameter setting unit 112 sets the "image improvement level" to a number such as "0," "1," "2," "3," . . . , or "N" (N is an integer). Greater importance is placed on image improvement as a larger number is set. One specific example: when the "image improvement level" is set to, for example, "4," the display proposal unit 113 does not make a proposal solely for selling a product and/or service but rather mainly proposes a scene in which a product and/or service looks attractive to a user so that the image of the supplier is improved even if the proposal does not lead to sales. For example, if the product is an automobile, the display proposal unit 113 makes "displays" mainly including a past attractive scene, an attractive scene of a future automobile, a scene in which technological strength looks attractive, or the like even if the displays do not lead to sales immediately.

(3) Repeater Acquisition Level

If a supplier does not simply aim to obtain the sales of a product and/or service at one-time sales opportunity but rather adopts a management strategy in which importance is placed on continuous purchase of products and/or services and acquisition of repeaters, regular customers, and the like, it may set the "repeater acquisition level" indicating what degree of importance is placed on acquisition of repeaters. In the present embodiment, the parameter setting unit 112 sets the "repeater acquisition level" to a number such as "0," "1," "2," "3," ..., or "N" (N is an integer). Greater importance is placed on acquisition of repeaters as a larger number is set. One specific example: the "repeater acquisition level" is set to, for example, "4"; and in order to sell healthy noodles, the display proposal unit 113 makes a proposal using "displays" that allow a user to imagine that the user is taking a meal with various scenes corresponding to seasons used as the background and feel that continuous purchase is attractive, so that the user can understand how good it is to regularly purchase healthy noodles in various scenes.

(4) Marketing Information Acquisition Level

If a supplier adopts a management strategy in which greater importance is placed on acquisition of information on the user trends or marketing trends than acquisition of sales, image, or the like, it sets the "marketing information acquisition level." In the present embodiment, the parameter setting unit 112 sets the "marketing information acquisition level" to a number such as "0," "1," "2," "3," ..., or "N" (N is an integer). Greater importance is placed on acquisition of marketing information as a larger number is set. One specific example: a supplier intends to sell soy milk and sets the "marketing information acquisition level" to "4,"; and the display proposal unit 113 proposes a proposal by preferentially using "displays" that allow the supplier to acquire information such as awareness of or interest in soy milk of a user and how the user will be involved in soy milk from then on, as well as makes a "display" that allows the user to easily imagine one scene and asks the user a question such as "do you want to drink soy milk in such a scene?".

Next, parameters set by users who want to enjoy the purchase process will be described. The parameters set by the parameter setting unit 112 also include the "gap level" indicating the gap with a product and/or service that a user intends to purchase. When a user receives a proposal of a product and/or service having a gap with a product and/or service that the user intends to purchase, they may feel it is fun or may obtain an unexpected finding. Although there is a risk, the entertaining characteristics of purchase may be increased. In the present embodiment, the parameter setting unit 112 sets the "gap level" to a number such as "0," "1," "2," "3," ..., or "N" (N is an integer). The gap is increased as a larger number is set. One specific example: a user intends to buy a spoon for sipping a soup and sets the "gap level" to "9" to enjoy shopping; the display proposal unit 113 presents not only a "display" of a soup spoon but also a "display" of a shovel for shoveling snow; and thus the user has fun.

The parameters set by the parameter setting unit 112 also include the "quiz level" indicating the degree to which purchase is made in a quiz format. By presenting a "display" in which purchase itself is in a quiz format, the entertaining characteristics can be increased. In the present embodiment, the parameter setting unit 112 can set the "quiz level" to a number such as "0," "1," "2," "3," ..., or "N" (N is an integer). The degree to which purchase is made in a quiz format is increased as a larger number is set.

One specific example: a user intends to purchase jeans, sets the "quiz level" to "7," and enjoys purchase in a quiz format while clearly specifying a silhouette shape and blanking the color, material, and supplier fields. Another specific example: a user intends to buy a shampoo and sets the "quiz level" to "10"; the display proposal unit 113 asks the user questions in a quiz format including "why do you want to buy this?" "what do you want?" "what color's package do you like?" "there is a celebrity who has purchased a shampoo of this supplier. Select from the following A, B, and C," and the like; and the user makes purchase while enjoying the quiz-format questions.

The parameters set by the parameter setting unit 112 also include the "randomness level." As used herein, the term "randomness" includes perfect randomness, randomness whose degree has been adjusted ("randomness level" "0," "1," "2," "3," ..., or "N" (N is an integer)), randomness within a specified product/service category ("randomness category selection" "A," "B," "C," ...), and the like.

The display proposal unit 113 randomly displays related, alternative, and/or competitive suppliers of a product and/or service sought by a user in accordance with the set "randomness level." Since products and/or services that have appeared randomly may be unexpected ones for the user, the user may feel that the appearance of such products and/or services is fun. The display proposal unit 113 may put a winning ticket with a predetermined probability among randomly displayed products and/or services and grant points to a winner.

One specific example: a user previously sets the "randomness level" to "3" by operating the user terminal 12, decides to buy gloves, and selects "gloves" as a search target through input; a portable body warmer is displayed as a related product and further a shogi board is displayed randomly; and thus the user becomes interested in a shogi game and further draws a winning ticket and are granted points.

The parameters set by the parameter setting unit 112 also include the "standard level" indicating the extent to which a proposed product and/or service deviates from a product and/or service that is generally regarded as standard. In the present embodiment, the parameter setting unit 112 can set the "standard level" to a number such as "0," "1," "2," "3," ..., or "N" (N is an integer). The deviation from the standard is increased as a larger number is set.

A user can use the "standard level" to select a product and/or service whose size, color, style, or the like is generally regarded as standard or a product and/or service deviating from the standard. One specific example: a user who is a new working adult wants to purchase reassuring standard products for the time being and thus sets the "standard level" to "9"; standard products are displayed; and the user purchases office wear, a shirt, a tie, a handkerchief, and the like. Another specific example: a user who is an artist wants to live in a style quite different from a standard one, sets the "standard level" to "0," and thus purchases a product of a style opposite to a clothing style regarded as standard with reference to a proposal using "displays" made by the display proposal unit 113. Yet another specific example: a user who is considering the purchase of a rice cooker decides to purchase one that is not quite the same as those owned by others and is somewhat unique, sets the "standard level" to "5," and purchases a rice cooker that is not the same as those owned by others and is moderately unique, with reference to products and/or services on "displays."

The parameters set by the parameter setting unit 112 also include the "taste selection parameter" indicating the favorite atmosphere or characteristics. For example, a user can select an Indian-style as a country, a medieval-style as an age, a tropical-style as an area, a soy meat-style as a contemporary fashion, a Katsushika Hokusai-style as a celebrity art style, and the like. In the present embodiment, the parameter setting unit 112 can set the "taste selection parameter" to an alphabet such as "A," "B," or "C." For example, "A" represents an Indian-style, and "B" represents a medieval-style.

One specific example: a user who wants an Indian-style cup sets the "taste selection parameter" to "A" by operating the user terminal 12; thus the parameter setting unit 112 sets the "taste selection parameter" to and the display proposal unit 113 displays Indian-style cups, as well as makes "displays" that can enhance the appearance of the cups. Another specific example: a user sets the "taste selection parameter" to a Katsushika Hokusai-style; and thus the display proposal unit 113 proposes ukiyoe-style products using "displays." Yet another specific example: a user sets the "taste selection parameter" to a tropical-style area; and thus the display proposal unit 113 makes "displays" with reference to stores in Tokyo that provide tropical-style interior or tropical-style products and/or services although Tokyo is not a tropical area.

The parameters set by the parameter setting unit 112 also include the "education level." In the present embodiment, the parameter setting unit 112 can set the "education level" to a number such as "0," "1," "2," "3," . . . , or "N" (N is an integer). The education level is increased as a larger number is set. One specific example: a user who intends to buy a cup sets the "education level" to a high level; and thus the display proposal unit 113 can teach the user the production area or production method of the cup, ingenuity exercised by the supplier, and the like. If the product is pottery, a user can be taught the history of pottery by the display proposal unit 113. There are persons who want to concentrate on the purchase of a product or are less interested in education, while there are also persons who are interested in not only purchase but also education, background knowledge, and the like and can take time for the purchase. For this reason, a user may adjust the extent to which education is incorporated into shopping by setting the "education level." Another specific example: a user who intends to purchase green tea adjusts the level of education or background knowledge by setting the "education level"; and thus the display proposal unit 113 displays the production area, production method, and distribution of tea leaves, the commitment of the producer, and the like using "displays," as well as has the user experience the tea leaves.

As described above, the product/service proposal system 1 determines a product and/or service to be proposed to a user on the basis of at least one of the user action history and the set parameters and makes a proposal leading the user to purchase the determined product and/or service to the user using "displays." Thus, the product/service proposal system 1 is able to make a proper proposal leading the user to purchase the product and/or service to the user and to promote the sales of the product and/or service.

The above embodiment is illustrative only, and the present invention can also be carried out by making various modifications to the embodiment without departing from the spirit and scope of the invention as set forth in the claims.

For example, the types of parameters set are illustrative only, and various types of parameters can be set in accordance with the preferences of a user or supplier.

The communication system of the product/service proposal system 1 is not limited to the blockchain communication in the above embodiment and may be, for example, pier-to-pier (P2P) communication or client-server communication, communication using a distributed storage blockchain, or a combination thereof.

While, in the above embodiment, the product/service proposal system 1 has been described as including the multiple nodes 10, the device configuration of the product/service proposal system 1 is not limiting. For example, the product/service proposal system 1 may consist of a single device or a client-server system. If the product/service proposal system 1 consists of a single device, this device may be a stand-alone device, which is not connected to a network such as the Internet.

What is claimed is:

1. A product and service proposal system for proposing a proposal from a supplier to a user considering purchase of at least one of a product or a service, the user indicating a determination to purchase the at least one of a product or a service via a user terminal associated with the user, the user terminal including at least an input device, a visual display device, and a camera, the proposal system comprising:

a control system including a central processing unit communicatively coupled to a storage device, the control system further including:

a user action history acquisition subsystem configured to acquire a user action history of the user considering purchase of the at least one of a product or a service, the user action history acquisition subsystem including a database stored in the storage device, the central processing unit searching for the user action history of the user considering purchase of at least one of a product or a service at a plurality of physical stores and at a plurality of online stores for storage in the database, the user action history of a respective user including a history of actions taken by the corresponding user and a history of actions taken upon the corresponding user when the respective user previously purchased a product or a service at a physical store or at an online store, or a history of actions taken by the corresponding user and a history of actions taken upon the corresponding user when the respective user via the corresponding user terminal associated with the user previously indicated a determination to purchase a product or a service at a physical store or at an online store, or a history of actions taken by the corresponding user and a history of actions taken upon the corresponding user when the respective user via the corresponding user terminal associated with the user currently indicates a determination to purchase a product or a service at a physical store or at an online store, and the history of actions taken by the user including at least one of the following: (a) image data or video data of the respective user's reactions when viewing a product or a service at a physical store or an online store, (b) image data or video data of the respective user's reactions when trying on a product at a physical store, (c) image data or video data of the respective user's reactions when touching a product at a physical store, (d) image data or video data of the respective user's reactions when using a product at a physical store, or (e) image data or video data of the respective user's reactions when experiencing a service at a physical store;

a parameter setting subsystem configured to set at least one of at least a parameter indicating a preference of the user considering purchase of at least one of a product or a service or at least a parameter indicating a preference of a supplier supplying one of a product or a service, the central processing unit selecting the at least a parameter indicating a preference of the user considering purchase of at least one of a product or a service and the at least a parameter indicating a preference of a supplier supplying one of a product or a service, the central processing unit selecting the at least a parameter indicating a preference of the user and the at least a parameter indicating a preference of the supplier responsive to either one of: (a) user input via the respective user terminal associated with the user, (b) supplier input via a supplier terminal associated with the supplier, or (c) analysis and interpretation of the user action history of the user considering purchase of at least one of a product or a service by the central processing unit, the at least a parameter indicating a preference of the user considering purchase of at least one of a product or a service includes a purpose grasped level indicating an extent to which the user has grasped at least one of a product or a service the user is considering to purchase, and the extent to which the user has grasped at least one of a product or a service includes only one of the following: (a) the user has decided exact details of a specific product or a specific service as well as a specific supplier of the corresponding product or a specific supplier of the corresponding service, (b) the user has decided exact details of a specific product or a specific service but has not decided a specific supplier of the corresponding product or a specific supplier of the corresponding service, and (c) the user has not decided exact details of a specific product or a specific service and has also not decided a specific supplier of a product or a specific supplier of a service;

a proposal rule storage subsystem configured to store proposal rules for each of the at least a parameter indicating a preference of the user considering purchase of at least one of a product or a service and the at least a parameter indicating a preference of a supplier supplying one of a product or a service, the proposal rule storage subsystem including a database stored in the storage device and storing the proposal rules for each of the at least a parameter indicating a preference of the user considering purchase of at least one of a product or a service and the at least a parameter indicating a preference of a supplier supplying one of a product or a service, and the stored proposal rule for the purpose grasped level parameter is a function of at least one of the user input on a corresponding input device of the respective user terminal of the user considering purchase of the at least one of a product or a service or the user action history of the user considering purchase of the at least one of a product or a service thereby resulting in: (a) proposing to the user only a specific supplier's product or a specific supplier's service when the user has decided exact details of a specific product or a specific service as well as a specific supplier of the corresponding product or a specific supplier of the corresponding service, (b) proposing to the user at least one of products of any of a plurality of suppliers thereof or services of any of a plurality of suppliers thereof when the user has decided exact details of a specific product or a specific service but has not decided a specific supplier of the corresponding product or a specific supplier of the corresponding service, and (c) proposing to the user a plurality of products or a plurality of services related to the input made by the user on the respective user terminal when the user has not decided exact details of a specific product or a specific service and has also not decided a specific supplier of a product or a specific supplier of a service; and a display proposal subsystem configured to propose at least one of a product or a service to the user for display on the visual display device of a corresponding user terminal, the central processing unit determining at least one of a product or a service to be proposed to the user according to at least one of the user action history of the user or the at least a parameter indicating a preference of the user and the at least a parameter indicating a preference of the supplier, and the display proposal subsystem restricts at least one of text data, image data, or video data, displayed on a corresponding user terminal's visual display device by adaptively selecting for display on the visual display device of the respective user's user terminal at least one of a product or a service according to the determination made by the central processing unit.

2. A product and service proposal system for proposing a proposal from a supplier to a user considering purchase of at least one of a product or a service, the user indicating a determination to purchase the at least one of a product or a service via a user terminal associated with the user, the user terminal including at least an input device and a visual display device, the proposal system comprising:

a control system including a central processing unit communicatively coupled to a storage device, the control system further including:

a user action history acquisition subsystem configured to acquire a user action history of the user considering purchase of the at least one of a product or a service, the user action history acquisition subsystem including a database stored in the storage device, the central processing unit searching for the user action history of the user considering purchase of at least one of a product or a service at a plurality of physical stores and at a plurality of online stores for storage in the database, the user action history of a respective user including a history of actions taken by the corresponding user and a history of actions taken upon the corresponding user when the respective user previously purchased a product or a service at a physical store or at an online store, or a history of actions taken by the corresponding user and a history of actions taken upon the corresponding user when the respective user via the corresponding user terminal associated with the user previously indicated a determination to purchase a product or a service at a physical store or at an online store, or a history of actions taken by the corresponding user and a history of actions taken upon the corresponding user when the respective user via the corresponding user terminal associated with the user currently indicates a determination to purchase a product or a service at a physical store or at an online store;

a parameter setting subsystem configured to set at least one parameter indicating a preference of the user considering purchase of at least one of a product or a service, the central processing unit selecting the at least one parameter indicating a preference of the user considering purchase of at least one of a product or a service, the central processing unit selecting the at least one parameter indicating a preference of the user responsive to either one of: (a) user input via the respective user terminal associated with the user or (b) analysis and interpretation of the user action history of the user considering purchase of at least one of a product or a service by the central processing unit, the at least one parameter indicating a preference of the user considering purchase of at least one of a product or a service includes a purpose grasped level indicating an extent to which the user has grasped at least one of a product or a service the user is considering to purchase, and the extent to which the user has grasped at least one of a product or a service includes only one of the following: (a) the user has decided exact details of a specific product or a specific service as well as a specific supplier of the corresponding product or a specific supplier of the corresponding service, (b) the user has decided exact details of a specific product or a specific service but has not decided a specific supplier of the corresponding product or a specific supplier of the corresponding service, and (c) the user has not decided exact details of a specific product or a specific service and has also not decided a specific supplier of a product or a specific supplier of a service;

a proposal rule storage subsystem configured to store proposal rules for each of the at least one parameter indicating a preference of the user considering purchase of at least one of a product or a service, the proposal rule storage subsystem including a database stored in the storage device and storing the proposal rules for each of the at least one parameter indicating a preference of the user considering purchase of at least one of a product or a service, and the stored proposal rule for the purpose grasped level parameter is a function of at least one of the user input on a corresponding input device of the respective user terminal of the user considering purchase of the at least one of a product or a service or the user action history of the user considering purchase of the at least one of a product or a service thereby resulting in: (a) proposing to the user only a specific supplier's product or a specific supplier's service when the user has decided exact details of a specific product or a specific service as well as a specific supplier of the corresponding product or a specific supplier of the corresponding service, (b) proposing to the user at least one of products of any of a plurality of suppliers thereof or services of any of a plurality of suppliers thereof when the user has decided exact details of a specific product or a specific service but has not decided a specific supplier of the corresponding product or a specific supplier of the corresponding service, and (c) proposing to the user a plurality of products or a plurality of services related to the input made by the user on the respective user terminal when the user has not decided exact details of a specific product or a specific service and has also not decided a specific supplier of a product or a specific supplier of a service; and a display proposal subsystem configured to propose at least one of a product or a service to the user for display on the visual display device of a corresponding user terminal, the central processing unit determining at least one of a product or a service to be proposed to the user according to at least one of: (a) a correlation between: (i) a history of actions taken by the corresponding user and a history of actions taken upon the corresponding user when the respective user currently indicates a determination to purchase a product or a service at a physical store or at an online store, and (ii) a history of actions taken by the corresponding user and a history of actions taken upon the corresponding user when the respective user previously purchased a product or a service at a physical store or at an online store or when the respective user previously indicated a determination to purchase a product or a service at a physical store or at an online store, or (b) the at least one parameter indicating a preference of the user, wherein if the history of actions include the user previously being at an online store and the user currently being at a physical store, the central processing unit, further, determines at least one of a product or a service to be proposed to the user according to: (c) a time the user spends viewing a product or a service on the online store, and the display proposal subsystem restricts at least one of text data, image data, or video data, displayed on a corresponding user terminal's visual display device by adaptively selecting for display on the visual display device of the respective user's user terminal at least one of a product or a service according to the determination made by the central processing unit.

3. The product and service proposal system of claim 1, wherein the at least a parameter indicating a preference of the user considering purchase of at least one of a product or a service includes a goal pursuing level indicating an extent to which the user prefers to purchase a product or a service in a short time;

wherein the stored proposal rule for the goal pursuing level parameter is a function of at least one of the user input on a corresponding input device of the respective user terminal of the user considering purchase of the at least one of a product or a service or the user action history of the user considering purchase of the at least one of a product or a service thereby resulting in proposing to the user a product or a service having higher similarity to a product or a service input by the user corresponding to an increase in the goal pursuing level, and proposing to the user a product or a service having lower similarity to a product or a service input by the user corresponding to a decrease in the goal pursuing level; and wherein the central processing unit, further, determines at least one of a product or a service to be proposed to the user according to the goal pursuing level parameter, and the display proposal subsystem restricts at least one of text data, image data, or video data, displayed on a corresponding user terminal's visual display device by adaptively selecting for display on the visual display device of the respective user's user terminal at least one of a product or a service according to the determination made by the central processing unit.

4. The product and service proposal system of claim 1, wherein the at least a parameter indicating a preference of the user considering purchase of at least one of a product or a service includes a process enjoying degree indicating an extent to which the user prefers to take time to purchase a product or a service;
wherein the stored proposal rule for the process enjoying degree parameter is a function of at least one of the user input on a corresponding input device of the respective user terminal of the user considering purchase of the at least one of a product or a service or the user action history of the user considering purchase of the at least one of a product or a service thereby resulting in proposing to the user a product or a service having lower similarity to a product or a service input by the user corresponding to an increase in the process enjoying degree, and proposing to the user a product or a service having higher similarity to a product or a service input by the user corresponding to a decrease in the process enjoying degree; and
wherein the central processing unit, further, determines at least one of a product or a service to be proposed to the user according to the process enjoying degree parameter, and the display proposal subsystem restricts at least one of text data, image data, or video data, displayed on a corresponding user terminal's visual display device by adaptively selecting for display on the visual display device of the respective user's user terminal at least one of a product or a service according to the determination made by the central processing unit.

5. The product and service proposal system of claim 1, wherein the at least a parameter indicating a preference of a user considering purchase of a product or a service further includes a related product proposal parameter indicating an extent to which proposals leading the user to purchase products or services related to the product or service that the user has indicated to purchase via the respective input device are made in addition to the proposal proposed by the display proposal subsystem;
wherein the stored proposal rule for the related product proposal parameter is a function of at least one of the user input on a corresponding input device of the respective user terminal of the user considering purchase of the at least one of a product or a service or the user action history of the user considering purchase of the at least one of a product or a service thereby resulting in proposing to the user a greater number of other products or services related to a product or a service input by the user corresponding to an increase in the related product proposal parameter, and proposing to the user a lesser number of other products or services related to a product or a service input by the user corresponding to a decrease in the related product proposal parameter; and
wherein the central processing unit, further, determines at least one of a product or a service to be proposed to the user according to the related product proposal parameter, and the display proposal subsystem restricts at least one of text data, image data, or video data, displayed on a corresponding user terminal's visual display device by adaptively selecting for display on the visual display device of the respective user's user terminal at least one of a product or a service according to the determination made by the central processing unit.

6. The product and service proposal system of claim 1, wherein the at least a parameter indicating a preference of a supplier supplying one of a product or a service includes at least one of: (a) a sales importance level indicating a degree of importance the supplier places on sales of a product or a service, (b) an image improvement level indicating a degree of importance the supplier places on an improvement in an image of the supplier, or (c) a marketing information acquisition level indicating a degree of importance the supplier places on acquisition of marketing information according to the user action history.

7. A non-transitory computer storage device for proposing a proposal from a supplier to a user considering purchase of at least one of a product or a service, the user indicating a determination to purchase the at least one of a product or a service via a user terminal associated with the user, the user terminal including at least an input device and a visual display device, the computer storage device operating on a computer having a central processing unit, the central processing unit being communicatively coupled to a storage unit, and the storage device operating on the computer, comprising:
configuring the central processing unit to establish a user action history subsystem configured to acquire a user action history of the user considering purchase of the at least one of a product or a service, the user action history acquisition subsystem including a database stored in the storage unit, the central processing unit being configured to search for the user action history of the user considering purchase of at least one of a product or a service at a plurality of physical stores and at a plurality of online stores for storage in the database, the user action history of a respective user including a history of actions taken by the corresponding user and a history of actions taken upon the corresponding user when the respective user previously purchased a product or a service at a physical store or at an online store, or a history of actions taken by the corresponding user and a history of actions taken upon the corresponding user when the respective user via the corresponding user terminal associated with the user previously indicated a determination to purchase a product or a service at a physical store or at an online store, or a history of actions taken by the corresponding user and a history of actions taken upon the corresponding user when the respective user via the corresponding user terminal associated with the user currently indicates a determination to purchase a product or a service at a physical store or at an online store;
configuring the central processing unit to establish a parameter setting subsystem configured to set at least one parameter indicating a preference of the user considering purchase of the at least one of a product or a service, the central processing unit being configured to select the at least one parameter indicating a preference of the user considering purchase of at least one of a product or a service, the central processing unit being configured to select the at least one parameter indicating a preference of the user responsive to either one of: (a) user input via the respective user terminal associated with the user, or (b) analysis and interpretation of the user action history of the user considering purchase of at least one of a product or a service by the central processing unit, the at least a parameter indicating a preference of the user considering purchase of at least one of a product or a service includes a purpose grasped level indicating an extent to which the user has grasped at least one of a product or a service the user is considering to purchase, and the extent to which the user has grasped at least one of a product or a service includes only one of the following: (a) the user has decided exact details of a specific product or a specific service as well as a specific supplier of the corresponding product or a specific supplier of the corresponding service, (b) the user has decided exact details of a specific product or a specific service but has not decided a specific supplier of the corresponding product or a specific supplier of the corresponding service, and (c) the user has not decided exact details of a specific product or a specific service and has also not decided a specific supplier of a product or a specific supplier of a service;

configuring the central processing unit to establish a proposal rule storage subsystem configured to store proposal rules for each at least one parameter indicating a preference of the user considering purchase of at least one of a product or a service, the proposal rule storage subsystem including a database stored in the storage unit to store the proposal rules for each at least one parameter indicating a preference of the user considering purchase of at least one of a product or a service, and the stored proposal rule for the purpose grasped level parameter is a function of at least one of the user input on a corresponding input device of the respective user terminal of the user considering purchase of at least one of a product or a service or the user action history of the user considering purchase of at least one of a product or a service thereby resulting in: (a) proposing to the user only a specific supplier's product or a specific supplier's service when the user has decided exact details of a specific product or a specific service as well as a specific supplier of the corresponding product or a specific supplier of the corresponding service, (b) proposing to the user at least one of products of any of a plurality of suppliers thereof or services of any of a plurality of suppliers thereof when the user has decided exact details of a specific product or a specific service but has not decided a specific supplier of the corresponding product or a specific supplier of the corresponding service, and (c) proposing to the user a plurality of products or a plurality of services related to the input made by the user on the respective user terminal when the user has not decided exact details of a specific product or a specific service and has also not decided a specific supplier of a product or a specific supplier of a service; and configuring the central processing unit to establish a display proposal subsystem configured to propose at least one of a product or a service to the user for display on the visual display device of a corresponding user terminal, the central processing unit being configured to determine at least one of a product or a service to be proposed to the user according to at least one of the user action history of the user or the at least one parameter indicating a preference of the user, and the display proposal subsystem restricts at least one of text data, image data, or video data, displayed on a corresponding user terminal's visual display device by adaptively selecting for display on the visual display device of the respective user's user terminal at least one of a product or a service according to the determination made by the central processing unit.

8. The product and service proposal system of claim 1,
wherein the at least a parameter indicating a preference of the user considering purchase of at least one of a product or a service includes a purchase decision climax parameter indicating which of first half, middle, and second half, in a product or a service purchase process, the user intends to purchase at least one of a product or a service;
wherein the stored proposal rule for the purchase decision climax parameter is a function of the user input on a corresponding input device of the respective user terminal of the user considering purchase of the at least one of a product or a service thereby resulting in proposing to the user suggestive information to lead the user to purchase at least one of a product or a service at a point in time in accordance with and corresponding to the user input indicative of which of first half, middle, and second half, in a product or a service purchase process, the user intends to purchase at least one of a product or a service; and
wherein the central processing unit, further, determines at least one of a product or a service to be proposed to the user according to the purchase decision climax parameter, and the display proposal subsystem restricts at least one of text data, image data, or video data, displayed on a corresponding user terminal's visual display device by adaptively selecting for display on the visual display device of the respective user's user terminal at least one of a product or a service according to the determination made by the central processing unit.

9. The product and service proposal system of claim 2, wherein if the history of actions include the user previously viewing an advertisement and the user currently being at a physical store, the central processing unit, further, determines at least one of a product or a service to be proposed to the user according to: (d) at least one of a date on or a time at which the user viewed the advertisement, or a geographical area in which the user viewed the advertisement, or specific details of the advertisement viewed by the user.

10. The product and service proposal system of claim 2, wherein if the history of actions include the user previously being at a first physical store and the user currently being at a second different physical store, the central processing unit, further, determines at least one of a product or a service to be proposed to the user according to: (e) at least a time the user stayed at the first store, or a viewing time of at least one of a product or a service by the user at the first store, or a try on of at least one of a product or a service by the user at the first store.

\* \* \* \* \*